(12) United States Patent
Osada et al.

(10) Patent No.: US 7,034,198 B2
(45) Date of Patent: Apr. 25, 2006

(54) METHOD FOR DECOMPOSING PLASTIC

(75) Inventors: Hideharu Osada, Nara (JP); Tatsutoshi Shimabara, Kyoto (JP)

(73) Assignee: Osada Giken Co., Ltd., Osaka (JP)

(*) Notice: Subject to any disclaimer, the term of this patent is extended or adjusted under 35 U.S.C. 154(b) by 643 days.

(21) Appl. No.: 10/106,451

(22) Filed: Mar. 27, 2002

(65) Prior Publication Data

US 2002/0179424 A1 Dec. 5, 2002

(30) Foreign Application Priority Data

Mar. 29, 2001 (JP) .............................. 2001-096469
Jun. 7, 2001 (JP) .............................. 2001-172091

(51) Int. Cl.
*G21F 9/14* (2006.01)
*A62D 3/00* (2006.01)

(52) U.S. Cl. .................. 588/19; 588/300; 588/301; 588/309; 588/314; 588/316; 588/318; 588/321; 588/400; 588/404; 201/10; 201/12; 201/42

(58) Field of Classification Search .................. 588/19, 588/300, 301, 309, 314, 316, 318, 321, 400, 588/404; 201/10, 12, 42; 585/240, 241
See application file for complete search history.

(56) References Cited

U.S. PATENT DOCUMENTS

| | | | | |
|---|---|---|---|---|
| 5,116,582 A | * | 5/1992 | Cooper et al. ........... | 422/186.3 |
| 5,480,524 A | * | 1/1996 | Oeste ...................... | 204/158.2 |
| 5,810,920 A | * | 9/1998 | Ueshima et al. ........... | 588/318 |
| 6,063,343 A | * | 5/2000 | Say et al. ................ | 422/186.3 |
| 6,288,300 B1 | * | 9/2001 | Lemus et al. .................. | 588/1 |
| 6,524,447 B1 | * | 2/2003 | Carmignani et al. ..... | 204/158.2 |

* cited by examiner

Primary Examiner—Alexis Wachtel
(74) Attorney, Agent, or Firm—Armstrong, Kratz, Quintos, Hanson & Brooks, LLP

(57) ABSTRACT

A conventional method of pyrolytically decomposing plastic to make low-molecular compounds is poor in efficiency of use of energy due to high heating temperatures (at least 600° C. and 800° C. at maximum).

The invention provides that a functional powder is heated to a predetermined temperature and pieces of plastic to be disposed are caused to be contacted with the heated powder, the functional powder including a powder which does in an aqueous solution state show alkalinity, and a photo-catalyst effect powder.

5 Claims, 1 Drawing Sheet

(a)    (b)

METHOD FOR DECOMPOSING PLASTIC

BACKGROUND OF THE INVENTION

1. Field of the Invention

The present invention relates to a method for decomposing plastic.

2. Prior Art

Conventionally, plastic has such problems that it is burnt to generate toxic gas or to have incomplete or partial combustion. Burning plastic recently becomes hard to be performed due to and in view of energy-saving policies and global warming. Besides, burying plastic in the ground cannot find any extra spaces for the purpose while causing a problem of environment pollution.

It is most preferable (and quite hard) to reuse (recycle) plastic under the foregoing circumstances. Nowadays, reusing plastic is mainly realized in such manners as crushing and melting again to form fibers or blocks, or introducing plastic wastes into a furnace.

Another approach for reusing plastic has been hitherto proposed as that plastic is pyrolytically decomposed to become low-molecular and be reused. In detail, plastic is heated more than heat decomposition temperature (without oxygen, the same in the following) so as to cause high-molecular carbon-carbon bonding to be cut and become low-molecular plastic as gasoline or naphtha.

The crushing method for reusing plastic involves a quite troublesome crushing operation using a crusher or the like to make smaller plastic wherein plastic when mixing foreign objects, such as metal, causes malfunction of machine. Resultant crushed objects that are at least few millimeters in size can usually not be melted again, as they are, and molded. The crushed objects may be mixed with concrete to form blocks. However, the crushed objects are large in size, and plastic and cement have poor adhesiveness between them, resulting in that blocks themselves are low in strength and cannot be usable equally to blocks provided conventionally.

The foregoing method introducing plastic wastes into a furnace has such problem that the resultant melt when formed into a usual molded article shows poor quality, which is inferred to be caused by an admixture or a mixed foreign object. Moreover, thermoplastic that has cross-linking to some extent when molded is not usable to be mixed with a virgin material and remolded.

In burning plastic for disposal, it is said that burning at 300 to 600° C. causes dioxin. And plastic does not burn under 300° C. Hence, plastic is to be burnt at high temperatures, but burning plastic at high temperatures is hard to be performed by plastic itself and needs a large quantity of fuel uneconomically.

Burning plastic at high temperatures can avoid the problem of dioxin but generates a great deal of carbon dioxide due to burning of a large quantity of fuel (and plastic itself) contrary directly to the national policies reducing carbon dioxide in respect of global warming.

The method pyrolytically decomposing plastic for providing low molecular plastic employs high heating temperatures (at least 600° C., and 800° C. at maximum) and thereby shows a poor efficiency of using energy. Moreover, heating pieces of plastic to those temperatures is hard. A method of heating plastic merely placed in a container cannot transmit heat efficiently to plastic due to much air and tends to heat in excess of necessity, having large energy loss. Using heavy oil for the heating operation is problematic in respect of energy saving and prevention of global warming.

Furthermore, there is concern about generation of dioxin depending on kinds of plastic and the degree of heating.

An approach heating pieces of plastic by mixing pieces of plastic with heated sand in order to improve heating efficiency has been proposed recently. This method can raise the heating efficiency but does perform heating pieces of plastic to the pyrolysis temperature, which does therefore not provide an essential solution of the foregoing problems.

SUMMARY OF THE INVENTION

The inventor has zealously worked and achieved the method of decomposing plastic under the above circumstances. The method of decomposing plastic is characterized in that functional powder is heated to a predetermined temperature and the heated powder is brought into contact with pieces of plastic to be disposed.

DETAILED DESCRIPTION OF THE INVENTION

A Decomposing plastic referred to in the present invention means that plastic is decomposed, i.e., configuration of plastic changes. The decomposed plastic is not necessarily to be a material for others or to provide a product by itself, otherwise may be discarded. The degree of decomposition may involve such states that molecules themselves are not discomposed and powder and granules form, or that molecules are pyrolytically decomposed to form low-molecular plastic.

A first characteristic of the present invention is to use a functional powder. The functional powder may be in two types one of which is an aqueous solution of the functional powder showing alkalinity, and the other type of the functional powder having an effect of photo-catalyst.

The alkali powder, i.e., the powder whose aqueous solution showing alkalinity may be oxide, hydroxide or carbonate of alkali metal or alkali earth metal. Oxide referred to here may be sodium oxide, calcium oxide, potassium oxide, and magnesium oxide. The functional powder may employ cement which has many kinds but mainly comprises alkali or alkali earth metal oxide powder.

Cement is basically made of $CaO$, $Al_2O_3$, $SiO_2$, and $Fe_2O_3$. All kinds among alumina cement, magnesia cement and an ordinary Portland cement were able to be used.

Sizes of the powder which is not uniform in size but has particle size dispersion may be preferably that 90% or more by weight of powder is 500μ or less (and more preferably 250μ or less) in particle diameter.

Another functional powder showing the photo-catalyst effect may be typically titanium oxide powder which empirically shown a higher effect in comparison with the foregoing alkali powder. The photo-catalyst effect powder does not necessarily use a special one but may be preferable to be smaller in size, i.e., equivalent to or smaller than the foregoing alkali powder, for example, such feature that 90% or more (by weight) of the photo-catalyst effect powder is 100μ or less in particle size.

The foregoing alkali powder and the photo-catalyst effect powder may be mixed for use. The alkali powder and the photo-catalyst effect powder are different in temperatures at which they can be treated and also in gases to be generated, so that properly mixing these powders enables such control as setting optimum temperatures at which those powders are treated and as setting a predetermined gas. The mixing ratio may be provided by 0 to 100% of each powder. There is a basic tendency that when the photo-catalyst effect powder is more applied, the decomposition temperatures lower and oxide gas is generated in many cases.

The functional powder may be mixed with a powder having no function unless it deviates from the gist of the present invention. The powder having no function may be plain sand, metal particles (about 0.5 to 5 mm in diameter), metal powder or the like.

The present invention may decompose any plastic including thermosetting resin which is likely hard to be decomposed. Heating temperatures may be adjusted depending on specific kinds of plastic and specific pyrolysis temperatures.

Specific kinds of plastic are different in temperatures at which they are decomposed and also in decomposition rate. Temperatures set higher than the decomposition temperatures do not cause any problems, and plastic when stagnates in a reaction tank in excess of necessity does not have any problems. In other words, plastic to be disposed mixed in plural kinds can be dealt with without having any problems.

The degree of heating the powders may differ depending on kinds of plastic and be about 200° C. Naturally, the higher the temperatures are, the more the reaction is carried out quickly. In fact, polyethylene was decomposed immediately at 250° C., gasified and disappeared. Pyrolysis temperatures for polyethylene is about 300° C. without oxygen. Oxidizing reaction occurs even at 100° C. or less under presence of oxygen, but the reaction is very slow and cannot be put into practical use without raising the temperatures to 300° C. or more. The present invention provides a practical decomposition rate at very low temperatures.

The present invention has such notable characteristics that using the alkali powder enables decomposition of most of plastic at 500° C. or less, and using the photo-catalyst effect powder does so at 400° C. or less.

Thermoplastic to be disposed may be dealt with in such manner that the functional powder is first heated to a predetermined temperature higher than softening point of thermoplastic to be disposed and under the pyrolysis temperature, and the plastic pieces are brought into contact with the heated powder.

This method does almost not cause generation of dioxin and is quite excellent in efficiency of use of energy.

Plastic may be preheated and showed more effect when preheated to around the softening point. The softening point of plastic is a temperature at which plastic is softened and deformable, for example, about 100° C. for low-density polyethylene, about 115° C. for medium-density polyethylene, and about 125° C. for high-density polyethylene, and further about 200 to 250° C. for crosslinked polyethylene. The softening points are values inherent in specific plastic and different depending on molecular weight (polymerization degree) and degree of crystallization of the specific same plastic.

The present invention has another notable characteristic that plastic can be decomposed at a temperature between the softening point and pyrolysis temperature. The pyrolysis temperature is a temperature at which molecules themselves of polymer are broken and carbon-carbon bonding is cut. The pyrolysis temperature in this case is a temperature at which decomposition is provided without oxygen, for example, about 280 to 300° C. for polyethylene.

The pieces of plastic are preferably few millimeters in size, but those several centimeters or more in size enjoyed a sufficient effect though having difference in decomposition time.

The method of bringing the functional powder and plastic pieces into contact with each other may be conceived variously. Essentially required is a sufficient amount of the powder enough to wholly cover the plastic pieces. A most preferable method of bringing the functional powder into contact with the plastic pieces may be to throw or introduce the plastic pieces into an excessive amount of the powder and to carry out agitation, for example, by use of a rotary kiln or a floating feature such as a fluidized bed having the same gist as of the above.

The functional powder comprising the photo-catalyst effect powder may be preferably applied with ultraviolet, which is not needed for the alkali powder. For application of ultraviolet, a container for mixing the photo-catalyst effect powder with plastic pieces, which container is transparent to allow light from the outside to enter the container, can be usable as it is. Otherwise, the container that light from the outside does not enter may be provided inside with an ultraviolet lamp which may be a small one, for example, 100 W, decided empirically depending on a specific amount of applied plastic pieces or a specific quantity of applied photo-catalyst effect powder to suffice for a substantial amount or quantity of the plastic pieces or the photo-catalyst effect powder.

The ultraviolet lamp is said not only to excite the photo-catalyst but also to allow chlorine atoms to fall from molecules of dioxin. The present invention is operable at low temperatures and thereby does not generate dioxin itself but can decompose dioxin (if generated) with the ultraviolet lamp.

The functional powder according to the present invention may be used solely but may be carried by a carrier (made, for example, of carbon or silica gel) to be readily handled. The carriers may be preferably smaller in size in consideration of transfer of heat, for example, preferably so provided that 90% or more of the carriers is 5 mm or less in diameter. The carriers may be otherwise formed by mixing silica sol and titanium oxide sol and calcining and granulating the same.

In the present invention, decomposed plastic may be crushed or formed into liquid or gas depending on kinds of plastic, heating temperatures, kinds of the functional powders, or the like. The manifold of chemical action is hard to be strictly defined. Qualitatively, decomposed plastic is likely to form gas when molecules are on the second dimension and small comparatively; when the temperatures are higher; or when the functional powder uses the photo-catalyst effect powder with application of ultraviolet.

Crushing plastic referred to herein does not mean that every plastic material can be crushed into small pieces as powder, but includes also such case that some kinds of plastic form particles or become about 2 to 3 mm in size, not forming powder.

Broken plastic when brought into contact with the functional powder having a predetermined temperature will be made into small pieces (as crushed or powdered) almost instantaneously (for a quickly progressing case). Reasons for the fact are not clear to the inventor but can be perceived as that provision of the functional powder, use of the powdery material, and the specific temperatures work chemically effectively.

In the present invention, when plastic is decomposed into liquid or gas, it is mostly such case that plastic in liquid state at ordinary temperatures is gasified by heating.

Gases caused in the present invention using the alkali powder to deal with polyethylene are mostly those having boiling point equivalent to gasoline, also including low-molecular gas in comparison with gasoline and further those having boiling point higher than gasoline. The gases are mostly hydrocarbon.

There was seen such case that when the decomposition progressed, low-molecules such as carbon dioxide was generated much. In this case, it is perceived that low-temperature oxidative destruction reaction occurs.

In case that plastic contains atoms other than carbon and hydrogen such as vinyl chloride, gases of compounds of those in combination or each of them are generated but can be removed by use of conventional chemical techniques.

The photo-catalyst is used to possibly generate, with its oxidative effect, oxide such as alcohol or aldehyde, which can be separated by use of an ordinary technique to provide a useful material.

The apparatus for using the method according to the present invention is enough when having a place for accommodating the functional powder, with an opening (an introduction port) for introducing plastic pieces to that place, and an agitating device, which may be separately provided. Those may be ordinarily available ones.

The apparatus for using the method according to the present invention may be a rotary kiln type enabling efficient continuous operation.

The present invention is applicable to plastic pieces adhered to other materials (metal, wood, etc.). Only plastic are gasified to be quite easily separated from those other materials. The remaining other materials (metal, etc.) may be separated from the functional powder by screening or the like manner.

PREFERRED EMBODIMENT OF THE INVENTION

EXAMPLE

Figure 1:
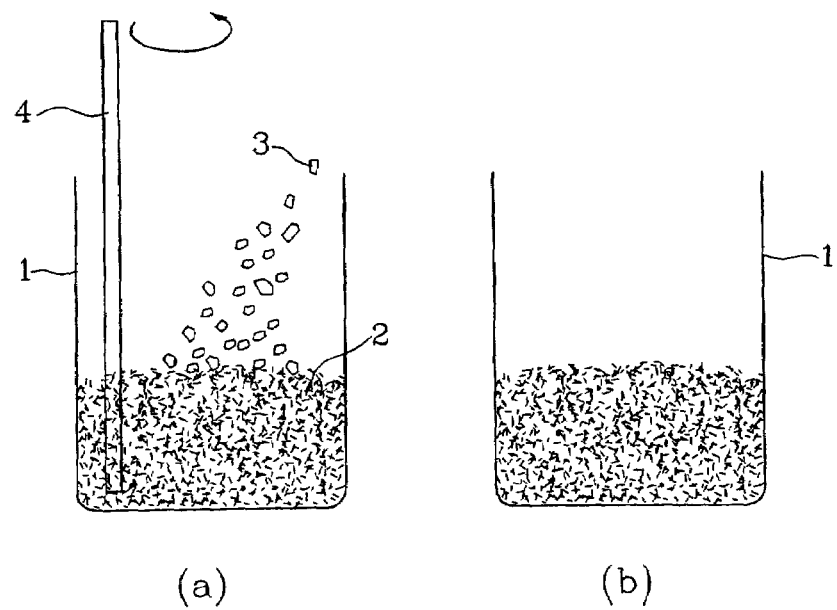
FIG. 1 is a sectional view showing an example of experiment of the method according to the present invention.

Next, the present invention will be explained in more details with referring to the manners of practical embodiment shown in the drawings.

FIG. 1 shows an experiment carried out by the inventor in which cement 2 is placed in a beaker 1 and heated to 250° C., followed by applying 20 to 30 pieces of polyethylene foam 3 (foamed four to six times, brown, about 5 mm cubic), and agitating with an agitator 4. All the plastic pieces disappeared quite shortly (in about one minute). Cement was weighed to be found as the same as before applying the plastic pieces. From this, it is appreciated that all of the placed plastic pieces was gasified and scattered into the air.

FIG. 1(a) shows placing the plastic pieces in the beaker, and FIG. 1(b) the state the plastic already gasified and scattered into the air, i.e., corresponding to an initial state of the device.

Figure 2:
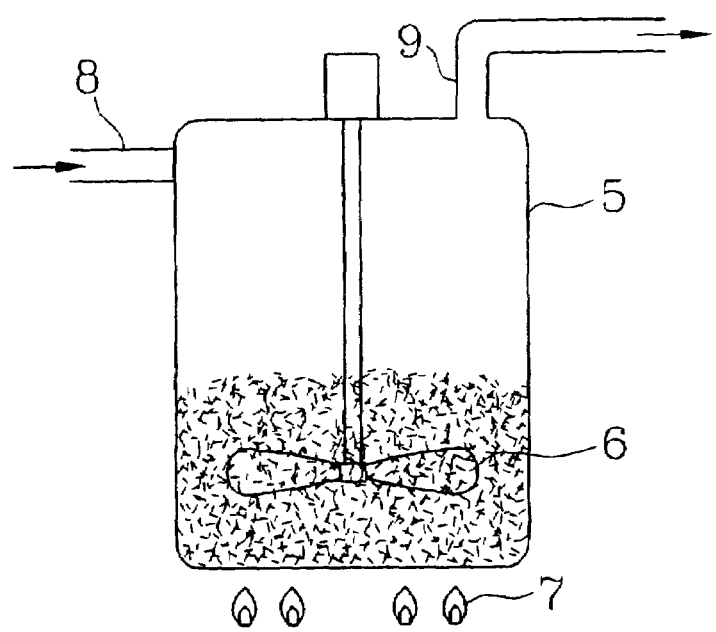
FIG. 2 is a sectional view showing an example of the method according to the present invention.

FIG. 2 shows an example of the method according to the present invention being used wherein cement 2 is filled in a reaction vessel 5. Cement 2 is set to a predetermined temperature 250° C. in the example. The device is provided inside with agitation blades 6 and also has a heating means 7 heating from the outside for keeping the temperatures, which may be an electric heater.

Plastic pieces 3 are placed through an inlet 8 and agitated to be gasified, with the same action as in the above beaker, and discharged from the exhaust port 9, which gas can be separated by use of difference of boiling points, by introducing into a liquid and causing reaction therewith, or by various manners. The gas may be used simply as fuel without necessity of that separating operation.

The system shown in FIG. 2 is poor in efficiency in heating the functional powder and may be provided with an electric heater in a coiled form extending into the device to enable heating uniformly to the inside of the device. Besides, the functional powder may be heated in a separate vessel and circulated and introduced into the reaction vessel. By this feature, any residue on the surface of the functional powder after decomposition operation, such as carbon, can be burnt and removed.

Plastic pieces may be placed in through the inlet 8 continuously or intermittently. The intermittent operation is better for preventing generated gases from much flowing out through the inlet 8. A device for preventing back-flow of gases may be provided separately.

In case of using the photo-catalyst powder as the functional powder, an ultraviolet lamp may be mounted inside (on the ceiling, etc.) of the device.

Next, an exemplification showing practically seen specific components is detailed.

Polyethylene was used as a plastic material to be broken into about 5 to 10 mm in size. The functional powder employed the photo-catalyst powder made of titanium oxide. The photo-catalyst powder 800 g was heated and applied with the polyethylene tips 50 g. The reaction was caused inside the sealed vessel from which air was not exhausted. Reaction time was 30 minutes for every case. In this example, ultraviolet or visible light was not applied in the vessel.

Gases generated in the vessel were collected and analyzed. Results of the analysis are shown in Table 1 as Examples 1 to 3.

TABLE 1

|  | Example 1 | Example 2 | Example 3 |
| --- | --- | --- | --- |
| Generated components | 250° C. | 300° C. | 350° C. |
| CO | 33.5 | 34.0 | 33.0 |
| $CO_2$ | 66.0 | 65.1 | 66.2 |
| Organic gases | 0.2 | 0.6 | 0.7 |
| Organic compounds | 0.3 | 0.3 | 0.1 |
| Polymer | — | — | — |
| Total | 100.0% | 100.0% | 100.0% |

The same experiment as the above without using titanium oxide was performed. Results of the experiment is shown in Table 2 as Comparative Examples 1 to 3.

TABLE 2

|  | Comparative Example 1 | Comparative Example 2 | Comparative Example 3 |
| --- | --- | --- | --- |
| Generated components | 250° C. | 300° C. | 350° C. |
| CO | 31.0 | 34.0 | 35.0 |
| $CO_2$ | 60.0 | 48.0 | 39.0 |
| Organic gases | 1.0 | 4.0 | 9.0 |
| Organic compounds | 8.0 | 14.0 | 17.0 |
| Polymer | — | — | — |
| Total | 100.0% | 100.0% | 100.0% |

Organic gases referred to in the tables are those appearing as gases at ordinary temperatures, for example, methane, ethane, propane, etc. Organic compounds are those appearing as liquid state at ordinary temperatures, such as hexane, heptane, etc.

In comparing the tables 1 and 2, it is appreciated that organic compounds are extremely less and more decomposed at every heating temperature in the Examples 1 to 3 in comparison with Comparative Examples. Organic substances cannot be discarded without separately treating them, which operation was troublesome conventionally.

As seen, the present invention can easily treat and decompose plastic without causing environmental pollution. Carbon monoxide may be burnt again to be carbon dioxide.

Conventional burning method for plastic employed burning at higher temperatures in order to reduce the foregoing organic compounds as largely as possible. Hence, the conventional method needed to use a burning-assistant such as heavy oil, combustion gas, necessitating or resulting in fruitless combustion, loss of or wasting fuel and generation of unnecessary carbon dioxide.

Cement powder in place of titanium oxide showed the same effect. Use of the photo-catalyst with application of ultraviolet expressed more effect as reasonably.

Effect of the Invention

The present invention provides the following advantages.
(1) Plastic can be easily decomposed or formed again as resources.
(2) Low-molecular compounds resulting from the decomposing are provided as various materials and are not needed to be buried in the earth.
(3) The invention does not employ the high temperature burning using the burning-assistant, so that it is quite effective for a countermeasure against global warming.
(4) Decomposing by the invention can be performed at lower temperatures in comparison with pyrolysis, thereby providing a great merit for energy.
(5) Burning is not used in disposing plastic or plastic is disposed at low temperatures, so that generation of dioxin is not caused at all.

We claim:

1. A method of decomposing plastic wherein titanium oxide powder having photo-catalyst effect is mixed with pieces of plastic to be disposed, and agitated while kept at between 200 and 500° C. without application of ultraviolet, thereby decomposing the pieces of plastic to make them into gases.

2. A method of decomposing plastic as set forth in claim 1 wherein 90% or more by weight of the titanium oxide powder is 100μ or less in particle diameter.

3. A method of decomposing plastic as set forth in claim 1 or 2 wherein the titanium oxide powder is carried by a carrier.

4. A method of decomposing plastic as set forth in claim 3 wherein sizes of the carrier are such that 90% or more of the carrier is 5 mm or less in diameter.

5. A method of decomposing plastic as set forth in claim 1 wherein the titanium oxide powder is formed by mixing silica sol and titanium oxide sol and calcining and granulating the same.

* * * * *